(12) United States Patent
Choi et al.

(10) Patent No.: US 10,100,788 B2
(45) Date of Patent: Oct. 16, 2018

(54) ENGINE SYSTEM FOR EXHAUSTING CONDENSATE WATER AND METHOD OF USING THE ENGINE SYSTEM

(71) Applicant: HYUNDAI MOTOR COMPANY, Seoul (KR)

(72) Inventors: Choo Saeng Choi, Seongnam-si (KR); Han Sang Kim, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 89 days.

(21) Appl. No.: 15/260,648

(22) Filed: Sep. 9, 2016

(65) Prior Publication Data

US 2017/0167449 A1 Jun. 15, 2017

(30) Foreign Application Priority Data

Dec. 11, 2015 (KR) .................. 10-2015-0176908

(51) Int. Cl.
*F02M 26/35* (2016.01)
*F04D 29/42* (2006.01)
(Continued)

(52) U.S. Cl.
CPC ............. *F02M 26/35* (2016.02); *F01N 3/005* (2013.01); *F02B 29/0468* (2013.01);
(Continued)

(58) Field of Classification Search
CPC .. F02M 26/35; F02M 26/50; F02M 35/10157; F02M 26/06; F04D 17/10;
(Continued)

(56) References Cited

U.S. PATENT DOCUMENTS

| 2004/0079079 A1* | 4/2004 | Martin .................... F01N 3/005 60/605.2 |
| 2006/0144046 A1* | 7/2006 | Vetrovec ................ F02B 33/40 60/605.1 |

(Continued)

FOREIGN PATENT DOCUMENTS

| JP | 2002-303146 A | 10/2002 |
| JP | 2010-090806 A | 4/2010 |

(Continued)

*Primary Examiner* — Hoang Nguyen
(74) *Attorney, Agent, or Firm* — McDermott Will & Emery LLP (57) ABSTRACT

An engine system for exhausting condensate water includes an intake line into which fresh air flows, an engine including a plurality of cylinders for generating driving torque by burning fuel, an exhaust line in which exhaust gas exhausted from the cylinders flows, a low-pressure exhaust gas recirculation system (LP-EGR) through which the exhaust gas flowing through the exhaust line is resupplied to the cylinder, and a turbocharger including a turbine rotated by the exhaust gas exhausted from the cylinder, a compressor for compressing external air and exhaust gas recirculation (EGR) gas by being rotated together with the turbine, and an exhaust pipe for exhausting condensate water to the outside, wherein the condensate water generated by the external air flows through the intake line and the EGR gas is recirculated by the LP-EGR.

10 Claims, 7 Drawing Sheets

(51) Int. Cl.
  *F02B 29/04* (2006.01)
  *F02M 26/06* (2016.01)
  *F01N 3/00* (2006.01)
  *F02D 41/02* (2006.01)
  *F02M 35/10* (2006.01)
  *F04D 17/10* (2006.01)
  *F02D 41/00* (2006.01)
  *F02M 26/50* (2016.01)

(52) U.S. Cl.
  CPC ..... *F02D 41/0065* (2013.01); *F02D 41/0235* (2013.01); *F02M 26/06* (2016.02); *F02M 26/50* (2016.02); *F02M 35/10157* (2013.01); *F04D 17/10* (2013.01); *F04D 29/4206* (2013.01); *F02D 41/0007* (2013.01); *F02D 2200/0414* (2013.01); *F02D 2200/0418* (2013.01); *F02D 2200/50* (2013.01); *F05D 2220/40* (2013.01); *F05D 2250/52* (2013.01); *F05D 2260/602* (2013.01)

(58) Field of Classification Search
  CPC ............ F04D 29/4206; F02D 41/0235; F02D 41/0065; F02D 2200/0414; F02D 2200/50; F02D 2200/04; F02B 29/0468; F01N 3/005; F05D 2220/40; F05D 2260/602; F05D 2250/52
  USPC .................................. 60/600, 605.1, 605.2
  See application file for complete search history.

(56) References Cited

U.S. PATENT DOCUMENTS

| | | | |
|---|---|---|---|
| 2010/0229549 A1* | 9/2010 | Taylor | F02B 29/0468 60/599 |
| 2012/0180452 A1* | 7/2012 | Caine | B60H 1/025 60/273 |
| 2013/0291536 A1* | 11/2013 | Koch | F02B 29/0468 60/599 |

FOREIGN PATENT DOCUMENTS

| | | |
|---|---|---|
| JP | 5076822 B2 | 11/2012 |
| JP | 2015-165110 A | 9/2015 |
| KR | 10-1998-0030215 A | 7/1998 |
| KR | 10-2012-0097431 A | 9/2012 |

* cited by examiner

ENGINE SYSTEM FOR EXHAUSTING CONDENSATE WATER AND METHOD OF USING THE ENGINE SYSTEM

CROSS-REFERENCE TO RELATED APPLICATION

This application claims the benefit of priority to Korean Patent Application No. 10-2015-0176908, filed with the Korean Intellectual Property Office on Dec. 11, 2015, the entire contents of which are incorporated herein by reference.

TECHNICAL FIELD

The present disclosure relates to an engine system and a method for exhausting condensate water and a method of using the engine system. More particularly, the present disclosure relates to an engine system and a method for exhausting condensate water that can exhaust condensate water generated by Exhaust Gas Recirculation (EGR) gas and fresh air at a turbocharger.

BACKGROUND

An engine mixes air and fuel and generates driving power by burning the mixed gases.

In order to obtain a required output power and combustion efficiency, sufficient air must be supplied to the engine. For this, a turbocharger is used to increase combustion efficiency and supply sufficient air to the engine.

Generally, a turbine of the turbocharger is rotated by a pressure of exhaust gas exhausted from the engine, a compressor of the turbocharger compresses fresh air flowing in from the outside, and the compressed air is supplied to a combustion chamber of the engine. A turbocharger has been applied to many diesel engines, and has also been applied to gasoline engines.

Further, NOx (nitrous oxide) included in the exhaust gas may be regulated as a major air pollutant and research has been carried out in order to reduce the amount of NOx in exhaust gases.

An exhaust gas recirculation (EGR) system mounted in a vehicle reduces noxious exhaust gases of the vehicle. Generally, the amount of NOx in the exhaust gas is increased in an oxygen rich air mixture, and the air mixture is combusted well, or thoroughly. Therefore, the exhaust gas recirculation system reduces the amount of NOx in the exhaust gas as a consequence of a part (e.g., 5-20%) of the exhaust gas being recirculated to the air mixture in order to reduce the oxygen ratio in the air mixture and so hinder combustion.

An LP-EGR (low pressure EGR) system is one type of exhaust gas recirculation (EGR) system. The LP-EGR system recirculates the exhaust gas passing through the turbine of the turbocharger to an intake path of an upstream side of the compressor.

However, the exhaust gas recirculated by the EGR system may have a high temperature and humidity. Therefore, condensate water may be generated when the recirculated exhaust gas and the external air having a low temperature are mixed. The condensate water may have a very high acidity due to various materials included in the exhaust gas.

If the condensate water contacts a compressor wheel being rotated at a high speed, then the compressor wheel may be damaged. Further, various parts (i.e., compressor wheel, or compressor housing, and so on) may become corroded by the condensate water having a high acidity. If the condensate water flows into a cylinder of an engine, combustion of the engine may become unstable.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an engine system and a method for exhausting condensate water that can exhaust the condensate water generated by EGR gas and external air to outside.

An engine system for exhausting condensate water according to an exemplary embodiment of the present disclosure may include an intake line into which fresh air flows; an engine including a plurality of cylinders for generating driving torque by burning fuel; an exhaust line in which exhaust gas exhausted from the cylinders flows; an LP-EGR in which the exhaust gas flowing through the exhaust line is resupplied to the cylinder; and a turbocharger including a turbine rotated by the exhaust gas exhausted from the cylinder, a compressor for compressing external air and EGR gas by being rotated together with the turbine, and an exhaust pipe for exhausting condensate water to the outside, the condensate water generated by the external air flowing through the intake line and the EGR gas recirculated by the LP-EGR.

The compressor may include a compressor housing and a compressor wheel disposed in the compressor housing, and an exhaust path may be formed in the exhaust pipe, the exhaust pipe may be formed at the compressor housing, and the exhaust path and a compression path of the compressor housing may communicate with each other.

The exhaust pipe may be formed in a tangential direction with respect to flow of the compressed air in the compression path.

The engine system may further include an exhaust valve disposed at the exhaust pipe and selectively exhausting condensate water.

The engine system may further include a driving information detector for detecting driving information of a vehicle; and a controller for adjusting opening and closing of the exhaust valve according to the driving information detected by the driving information detector.

The controller may open the exhaust valve when a condensate water generation condition is satisfied and boosting pressure of the turbocharger is greater than pressure of the exhaust pipe.

The condensate water generation condition may be stored in the controller as map data according to an external air temperature, an EGR gas temperature and an EGR gas amount, and the controller may determine whether the condensate water generation condition is satisfied by comparing the external air temperature, the EGR gas temperature and the EGR gas amount detected by the driving information detector to the map data.

A method for exhausting condensate water according to another exemplary embodiment of the present disclosure including a turbocharger may include a turbine and a compressor; an exhaust pipe formed at a compressor housing of the compressor; and an exhaust valve disposed at the exhaust pipe and selectively exhausting condensate water to the outside; the method may include, by a driving information detector, detecting driving information of a vehicle; by a controller, determining whether a condensate water generation condition is satisfied from the driving information; by the controller, comparing a boosting pressure of the compressor to a pressure in the exhaust pipe; and by the controller, adjusting opening and closing of the exhaust valve.

The driving information may include an external air temperature, an EGR gas temperature, an EGR gas amount, a boost pressure by the compressor and a pressure in the exhaust pipe.

The condensate water generation condition may be stored in the controller as a map data according to the external air temperature, the EGR gas temperature and the EGR rate, it may be determined whether the condensate water generation condition is satisfied by comparing the external air temperature, the EGR gas temperature and the EGR gas amount detected by the driving information detector to the map data, by the controller.

The exhaust valve may be opened by the controller when the condensate water generation condition is satisfied and the boost pressure is greater than the pressure in the exhaust pipe.

According to an exemplary embodiment of the present disclosure, since an exhaust pipe and an exhaust valve are disposed at a compressor of a turbocharger, condensate water generated by EGR gas and external air can be exhausted to outside.

Further, since the condensate water is exhausted to the outside, it is possible to prevent damage of a compressor wheel and corrosion of various parts, and obtain combustion stability of the engine.

BRIEF DESCRIPTION OF THE DRAWINGS

The drawings are provided for reference in describing exemplary embodiments of the present disclosure, and the spirit of the present disclosure should not be construed only by the accompanying drawings.

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly describe the present disclosure, portions that are not connected with the description will be omitted. Like reference numerals may designate like elements throughout the specification.

In addition, the size and thickness of each configuration shown in the drawings may be arbitrarily shown for better understanding and ease of description, but the present disclosure is not limited thereto. In the drawings, the thickness of layers, films, panels, regions, etc., may be exaggerated for clarity.

Hereinafter, an engine system for exhausting condensate water according to an exemplary embodiment of the present disclosure will be described in detail with reference to the accompanying drawings.

Figure 1:
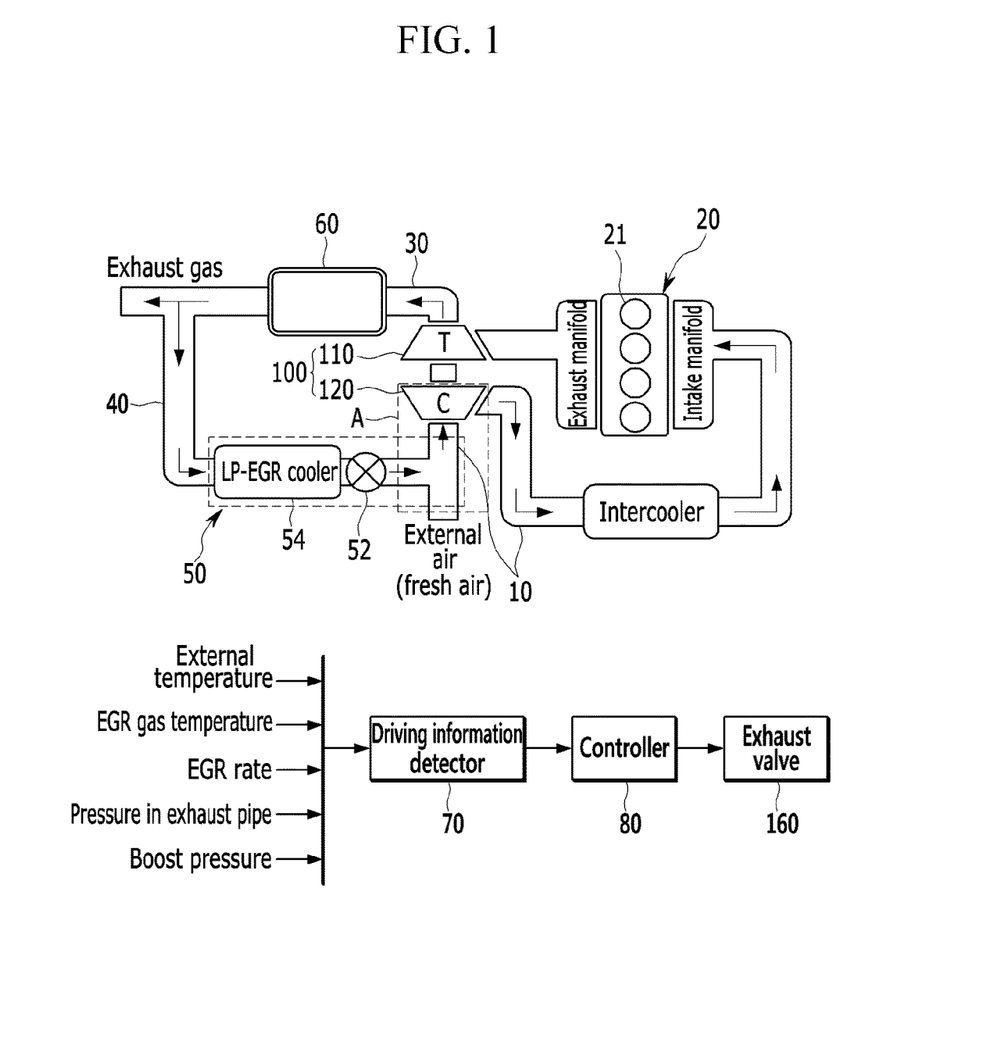
FIG. 1 is a schematic view illustrating an engine system for exhausting condensate water according to an exemplary embodiment of the present disclosure.

FIG. 1 is a schematic view illustrating an engine system for exhausting condensate water according to an exemplary embodiment of the present disclosure.

As shown in FIG. 1, an engine system for exhausting condensate water (hereinafter, referred to as an 'engine system') according to an exemplary embodiment of the present disclosure may include an intake line 10 into which fresh air flows, an engine 20 including a plurality of cylinder 21 generating driving torque by burning fuel, an exhaust line 30 in which exhaust gas exhausted from the cylinders 21 flows, a low-pressure exhaust gas recirculation system (LP-EGR) 50 for resupplying exhaust gas flowing through the exhaust line 30 to the cylinder 21, and a turbocharger 100 that compresses the fresh air (or external air) flowing in through the intake line 10 and the recirculation gas (hereinafter, will be referred to as 'EGR gas') flowing in through the recirculation line 40 and supplies the compressed air to the cylinders 21.

Various exhaust gas purification apparatuses 60 that purify exhaust gas exhausted from the cylinder 21 may be disposed at the exhaust line 30. The exhaust gas purification apparatus 60 may include an LNT (lean NOx trap), a DOC (diesel oxidation catalyst), and/or a DPF (diesel particulate filter).

The LP-EGR 50 may include a recirculation line 40 branched at the exhaust line 30 and joined at the intake line 10, an EGR cooler 54 disposed at the recirculation line 40, and an EGR valve 52 disposed at the recirculation line 40. The EGR cooler 54 may cool EGR gas recirculated through the recirculation line 40. A recirculation gas amount is adjusted by the EGR valve 52.

The turbocharger 100 may include a turbine 110 rotated by exhaust gas exhausted from the cylinder 21, and a compressor 120 for turbocharging the fresh air and recirculation gas by being rotated together with the turbine 110.

The turbine 110 may include a turbine housing 140, and a turbine wheel 130 disposed in the turbine housing 140 and rotated by a rotational force of exhaust gas exhausted from the cylinder 21. The compressor 120 may include a compressor housing 140 and a compressor wheel 130 disposed in the compressor housing 140 and rotated together with the turbine wheel. Fresh air and recirculation gas may be compressed by a rotation of the compressor wheel 130, and the compressed gas may be supplied to the cylinder 21.

Figure 2:
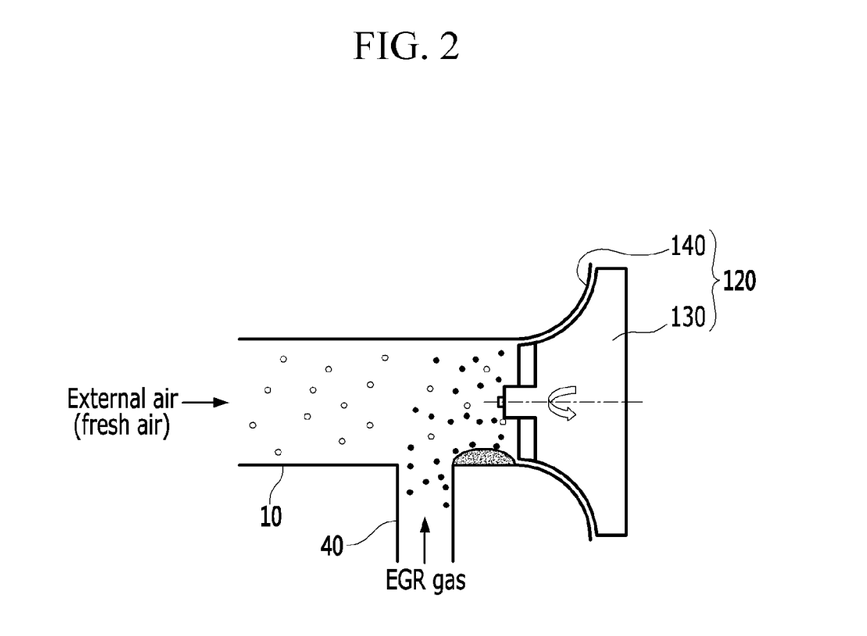
FIG. 2 is an enlarged view of 'A' of FIG. 1.

Meanwhile, as shown in FIG. 2, when the high temperature and humidity EGR gas and the low temperature external air are mixed, condensate water may be generated as moisture included in the EGR gas is condensed.

The condensate water may flow into the compressor housing 140 of the turbocharger 100, and the compressor wheel 130 may be damaged when the condensate water contacts the compressor wheel 130. Further, the condensate water may have a high acidity, the condensate water may corrode various parts, such as the compressor wheel 130 and the compressor housing 140.

In order to solve above problems, the engine system according to an exemplary embodiment of the present disclosure may exhaust the condensate water generated by the fresh air and the recirculation gas using an exhaust pipe 150 and an exhaust valve 160 formed at the compressor housing 140.

Hereinafter, the exhaust pipe 150 and the exhaust valve 160 of the engine system according to an exemplary embodiment of the present disclosure will be described.

Figure 3:
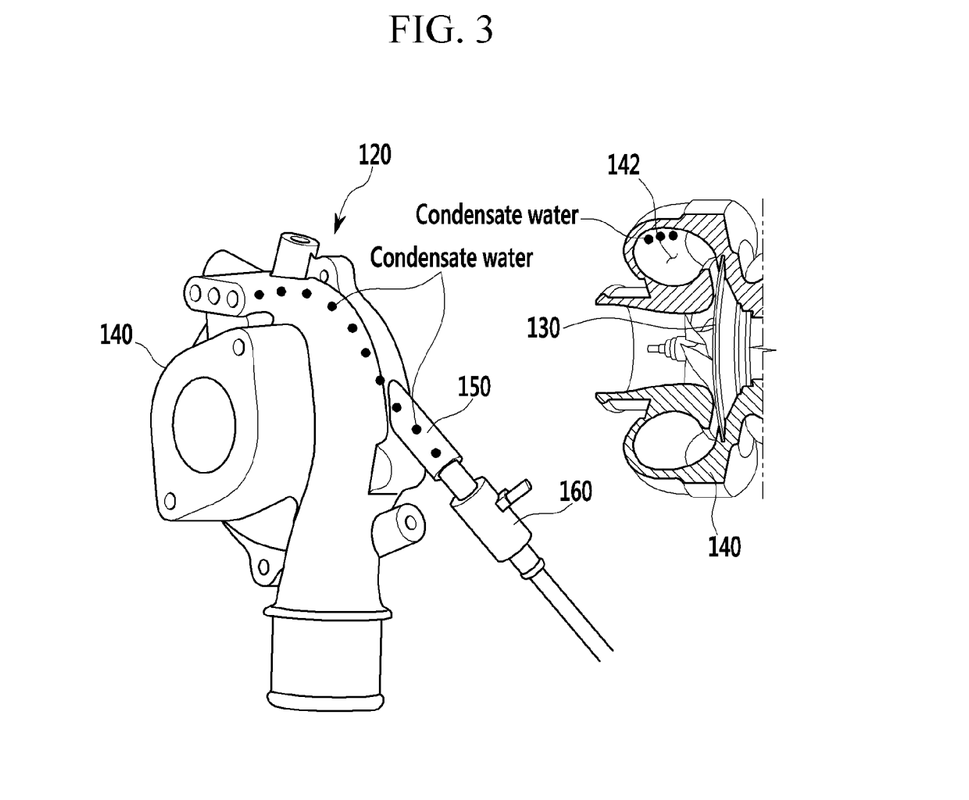
FIG. 3 is a perspective view illustrating a compressor housing of a turbocharger according to an exemplary embodiment of the present disclosure.
Figure 4A:
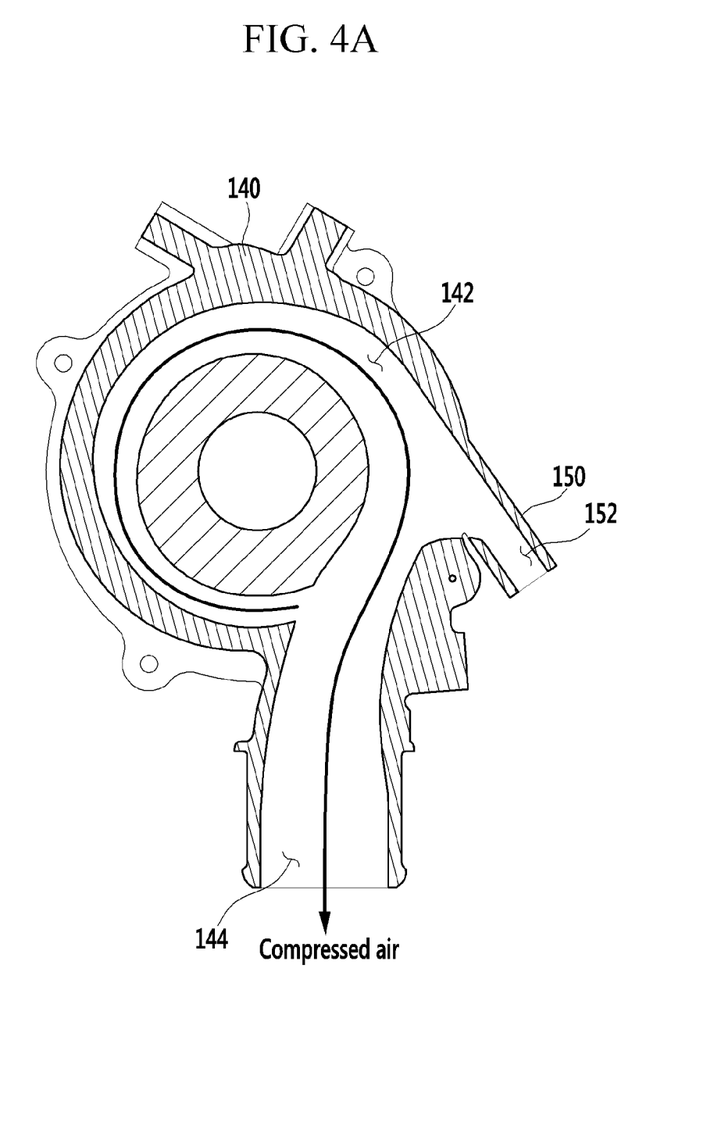
FIG. 4A and FIG. 4B are cross-sectional views illustrating a compressor of a turbocharger according to exemplary embodiments of the present disclosure.
Figure 4B:
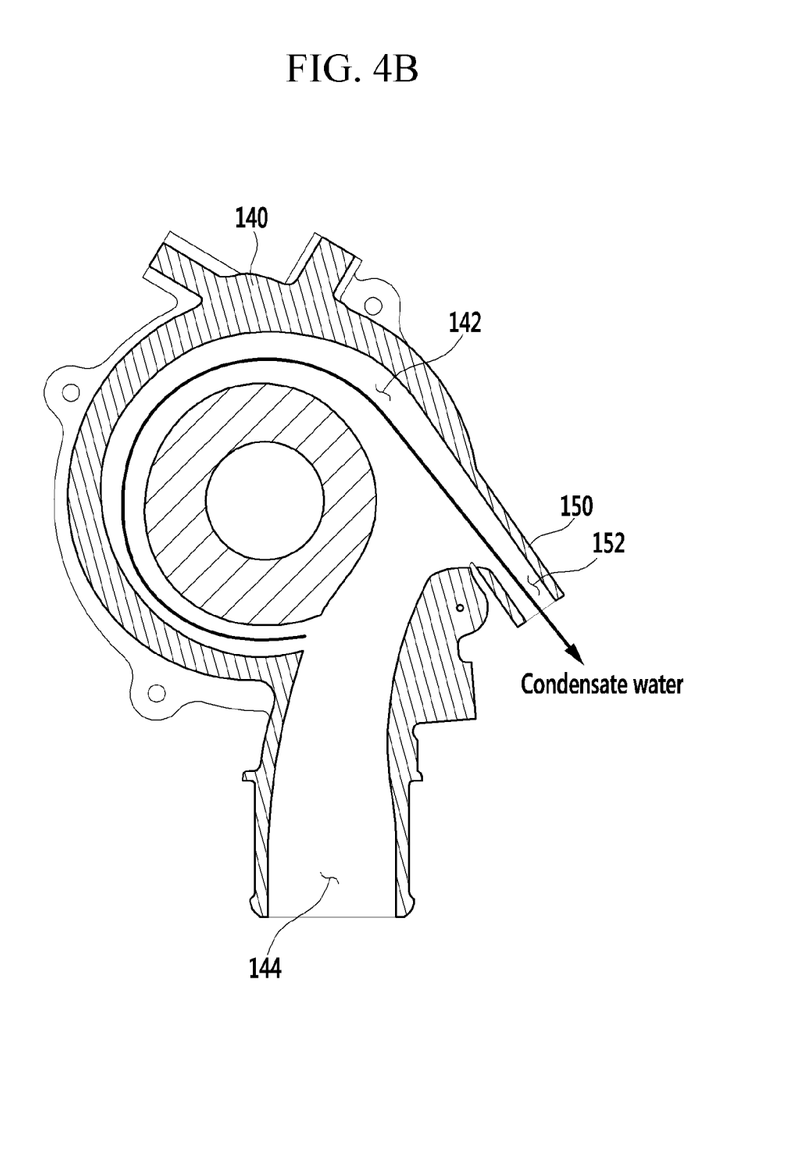

FIG. 3 is a perspective view illustrating a compressor housing of a turbocharger according to an exemplary embodiment of the present disclosure. FIG. 4A and FIG. 4B are cross-sectional views illustrating the compressor of the turbocharger according to an exemplary embodiment of the present disclosure.

As shown in FIG. 3, FIG. 4A and FIG. 4B, a compressor wheel 130 may be mounted in the compressor housing 140. The compressor wheel 130 may compress the fresh air and the recirculation gas by being rotated together with the turbine wheel. The compressed fresh air and recirculation gas by the compressor wheel 130 may flow through a compression path 142 formed in the compressor housing 140. The compression path 142 may be formed as a circular shape corresponding to a rotation of the compressor wheel 130.

The exhaust pipe 150 may be formed at the compressor housing 140, and an exhaust path 152 formed in the exhaust pipe 150 may communicate, or may fluidly communicate, with the compression path 142. The exhaust path 152 of the exhaust pipe 150 may be formed in a tangential direction of the compression path 142 (i.e., a tangential direction with respect to a flow of the compressed air in the compression path 142).

The exhaust valve 160 may be mounted at the exhaust pipe 150, and the condensate water may be selectively exhausted by the exhaust pipe 150. Opening and closing of the exhaust valve 160 may be adjusted by a controller 80, and a detailed description of the controller 80 will appear below.

The external air flowing through the intake line 10 and the EGR gas flowing through the recirculation line 40 may flow into a compression path 142 of the compressor housing 140. If the fresh air having low temperature and the recirculation gas having high temperature and humidity are mixed, moisture included in the recirculation gas may condense into a liquid, or water. The condensate water may flow into the compression path 142 of the compressor housing 140.

The external air and the EGR gas flowing through the compression path 142 of the compressor housing 140 may be compressed by a rotation force of the compressor wheel 130, and the compressed external air and EGR gas is supplied to the cylinder 21 through a connection path 144.

However, a mass of the condensate water is heavy relative to the mass of the fresh air and the recirculation gas. Therefore, the condensate water may be moved to an outside of the compression path 142 by a centrifugal force generated by a rotation of the compressor wheel 130, and exhausted through the exhaust path 152 of the exhaust pipe 150 when the exhaust valve 160 is opened. At this time, the exhaust path 152 may be formed to a tangential direction of the compression path 142, and the condensate water may be smoothly exhausted outside through the exhaust pipe 150.

The engine system according to an exemplary embodiment of the present disclosure may further include a driving information detector 70 for detecting driving information of a vehicle, and a controller 80 for adjusting opening and closing of the exhaust valve 160 according to the driving information detected by the driving information detector 70.

The driving information detected by the driving information detector 70 may include an external air temperature, an EGR gas temperature, an EGR gas amount, a boost pressure produced by the compressor 120, and a pressure in the exhaust pipe 150. The driving information detected by the driving information detector 70 may be transmitted to the controller 80.

The controller 80 may be realized by one or more processors activated by a predetermined program, and the predetermined program may be programmed to perform each step of a method for exhausting condensate water according to an embodiment of this disclosure.

When a condensate water generation condition is satisfied and the boosting pressure is greater than a pressure of the exhaust pipe 150, the controller 80 may exhaust the condensate water by opening the exhaust valve 160.

The condensate water generation condition may be stored in the controller 80 in a map data format according to an external air temperature, the EGR gas temperature, and the recirculation gas amount.

Figure 5:
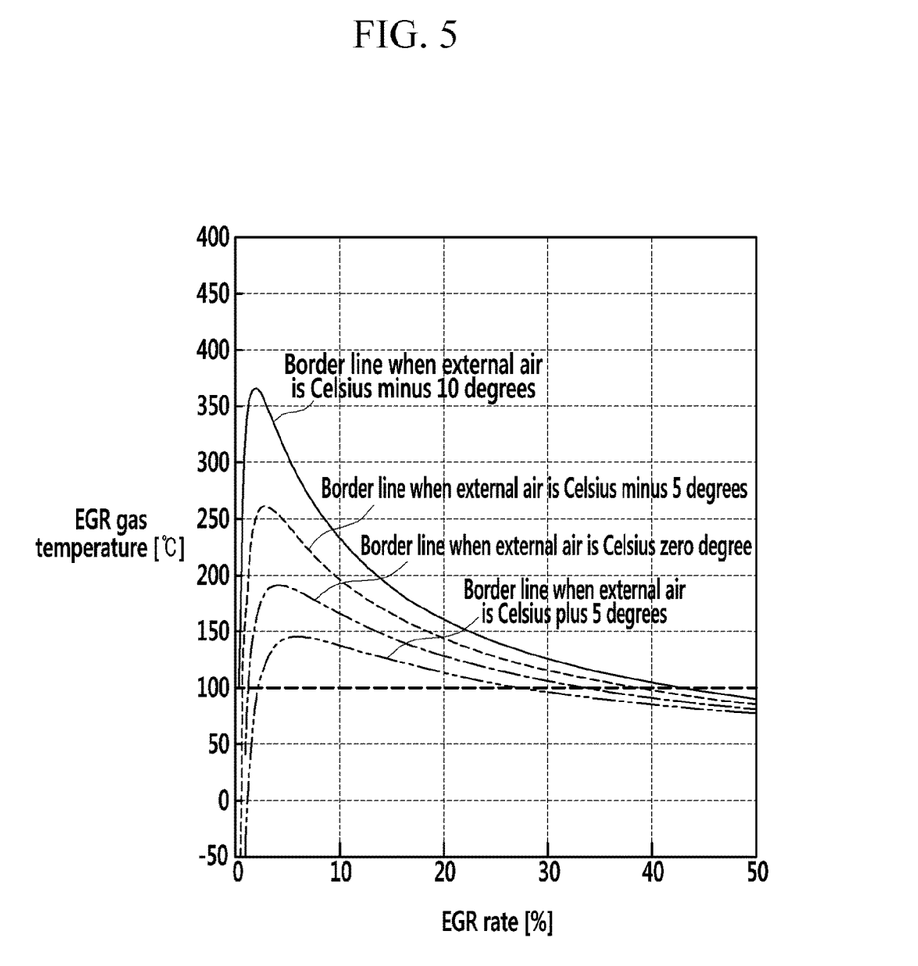
FIG. 5 is a graph for explaining a condensate water generation condition according to an exemplary embodiment of the present disclosure.

Referring to FIG. 5, the condensate water generation condition will be described in detail.

FIG. 5 is a graph for explaining a condensate water generation condition according to an exemplary embodiment of the present disclosure. In FIG. 5, the horizontal axis denotes EGR rate (exhaust gas recirculation rate), and the vertical axis denotes the EGR gas temperature. The graph of FIG. 5 is a result of experimentation. The EGR rate implies the EGR gas amount with respect to the external air amount.

Each border line of FIG. 5 shows a generation condition of the condensate water according to the EGR rate, the EGR gas temperature, and the external air temperature. That is, condensate water may be generated when the EGR gas temperature is higher than the border line.

For example, if the external air temperature is 10 degrees Celsius and the EGR rate is 10%, then the condensate water is generated when the EGR gas temperature is 230 degrees Celsius. If the external air temperature is 0 degrees Celsius and the EGR rate is 10%, then the condensate water is generated when the EGR gas temperature is 200 degrees Celsius.

The condensate water generation conditions according to the external air temperature, the EGR gas temperature, and the EGR rated shown in FIG. 5 may be stored in the controller 80 as map data, the controller 80 may compare the external air temperature, the EGR gas temperature and the EGR rate detected by the driving information detector 70 to the map data, and determine whether the condensate water generation condition is satisfied.

The controller 80 may exhaust the condensate water by opening the exhaust valve 160 when a boost pressure is greater than a pressure in the exhaust pipe 150. Since the condensate water generated in the compressor housing 140 may not be exhausted to the outside when the boost pressure is less than the pressure in the exhaust pipe 150, the controller 80 may prevent a lowering of the internal pressure of the compressor housing 140 by closing the exhaust valve 160.

Hereinafter, a method for exhausting condensate water according to an exemplary embodiment of the present disclosure will be described in detail with reference to accompanying drawings.

Figure 6:
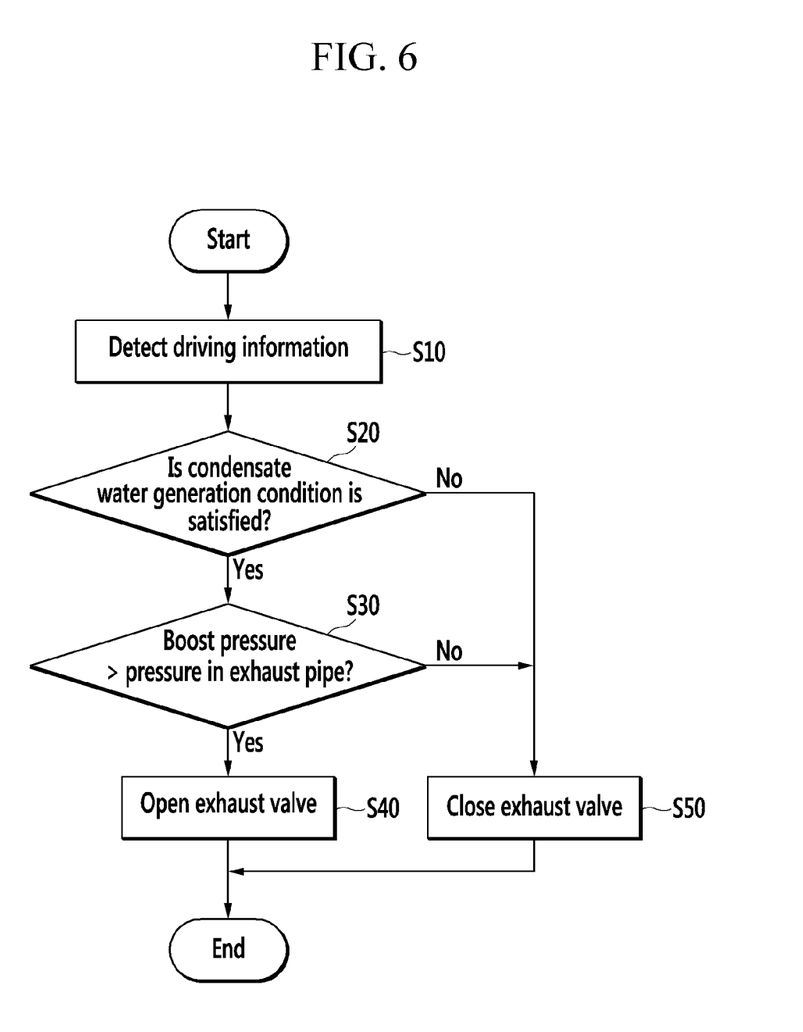
FIG. 6 is a flowchart illustrating a method for exhausting condensate water according to an exemplary embodiment of the present disclosure.

FIG. 6 is a flowchart illustrating a method for exhausting condensate water according to an exemplary embodiment of the present disclosure.

As shown in FIG. 6, the driving information detector 70 may detect a driving information of a vehicle, and the detected driving information may be transmitted to the controller 80 at step S10. The driving information may include an external air temperature, an EGR gas temperature, an EGR gas amount, a boost pressure by the compressor 120 and a pressure in the exhaust pipe 150.

The controller 80 may determine whether a condensate water generation condition is satisfied from the driving information at step S20.

The controller 80 may determine whether the condensate water generation condition is satisfied by comparing map data according to the external air temperature, the EGR gas temperature and the EGR rate to the external air temperature, the EGR gas temperature and the EGR rate detected by the driving information detector 70.

The controller 80 may close the exhaust valve 160 when the condensate water generation condition is not satisfied at step S50.

At step S20, the controller 80 may determine whether the boost pressure by the compressor 120 is greater than the pressure in the exhaust pipe 150 when the condensate water generation condition is satisfied at step S30.

When the boost pressure is greater than the pressure in the exhaust pipe 150, the controller 80 may exhaust the condensate water generated in compression path 142 of the compressor housing 140 by opening the exhaust valve 160 at step S40.

However, when the boost pressure is smaller than the pressure in the exhaust pipe 150, the controller 80 may close the exhaust valve 160 at step S50.

As described above, according to an exemplary embodiment of the present disclosure, since the condensate water generated by low temperature external air and high temperature and humidity EGR gas is exhausted to the outside, it is possible to prevent damage of the compressor wheel 130. Further, it is possible to prevent corrosion of various parts by the condensate water, which may have a high acidity.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An engine system for exhausting condensate water, comprising:
    an intake line into which fresh air flows;
    an engine including a plurality of cylinders for generating driving torque by burning fuel;
    an exhaust line in which exhaust gas exhausted from the cylinders flows;
    a low-pressure exhaust gas recirculation system (LP-EGR) through which the exhaust gas flowing through the exhaust line is resupplied to the cylinder; and
    a turbocharger including a turbine rotated by the exhaust gas exhausted from the cylinder, a compressor for compressing external air and exhaust gas recirculation (EGR) gas by being rotated together with the turbine, and an exhaust pipe for exhausting condensate water to the outside, wherein the condensate water generated by the external air flows through the intake line and the EGR gas is recirculated by the LP-EGR,
    wherein the compressor includes a compressor housing and a compressor wheel disposed in the compressor housing, and
    an exhaust path is formed in the exhaust pipe, the exhaust pipe is formed at the compressor housing, and the exhaust path and a compression path of the compressor housing communicate with each other.

2. The engine system for exhausting condensate water of claim 1, wherein the exhaust pipe is formed in a tangential direction with respect to flow of the compressed air in the compression path.

3. The engine system for exhausting condensate water of claim 1, further comprising an exhaust valve disposed at the exhaust pipe and selectively exhausting condensate water.

4. The engine system for exhausting condensate water of claim 3, further comprising:
    a driving information detector for detecting driving information of a vehicle; and
    a controller for adjusting opening and closing of the exhaust valve according to the driving information detected by the driving information detector.

5. The engine system for exhausting condensate water of claim 4, wherein the controller opens the exhaust valve when a condensate water generation condition is satisfied and boosting pressure of the turbocharger is greater than pressure of the exhaust pipe.

6. The engine system for exhausting condensate water of claim 5, wherein the condensate water generation condition is stored in the controller as map data according to an external air temperature, an EGR gas temperature and an EGR gas amount, and
    the controller determines whether the condensate water generation condition is satisfied by comparing the external air temperature, the EGR gas temperature and the EGR gas amount detected by the driving information detector to the map data.

7. A method for exhausting condensate water, the method including a turbocharger including a turbine and a compressor, an exhaust pipe formed at a compressor housing of the compressor, and an exhaust valve disposed at the exhaust pipe and selectively exhausting condensate water to the outside, the method including:
    by a driving information detector, detecting driving information of a vehicle;
    by a controller, determining whether a condensate water generation condition is satisfied from the driving information;
    by the controller, comparing a boosting pressure of the compressor to a pressure in the exhaust pipe; and
    by the controller, adjusting opening and closing of the exhaust valve.

8. The method of claim 7, wherein the driving information includes an external air temperature, an EGR gas temperature, an EGR gas amount, a boost pressure by the compressor and a pressure in the exhaust pipe.

9. The method of claim 8, wherein the condensate water generation condition is stored in the controller as map data according to the external air temperature, the EGR gas temperature and the EGR rate, the condensate water generation condition is determined to be satisfied by comparing the external air temperature, the EGR gas temperature and the EGR gas amount detected by the driving information detector to the map data, by the controller.

10. The method of claim 7, wherein the exhaust valve is opened by the controller when the condensate water generation condition is satisfied and the boost pressure is greater than the pressure in the exhaust pipe.

* * * * *